US012798200B2

(12) United States Patent
Hori et al.

(10) Patent No.: US 12,798,200 B2
(45) Date of Patent: Nov. 17, 2026

(54) METHOD FOR MANUFACTURING HIGH PRESSURE TANK

(71) Applicant: HONDA MOTOR CO., LTD., Tokyo (JP)

(72) Inventors: Masanori Hori, Wako (JP); Kosuke Tatsushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 18/820,436

(22) Filed: Aug. 30, 2024

(65) Prior Publication Data

US 2025/0074013 A1 Mar. 6, 2025

(30) Foreign Application Priority Data

Sep. 5, 2023 (JP) ................................ 2023-143334

(51) Int. Cl.
*B29C 70/32* (2006.01)
*B29C 53/66* (2006.01)
(Continued)

(52) U.S. Cl.
CPC .............. *B29C 70/32* (2013.01); *B29C 53/66* (2013.01); *F17C 1/06* (2013.01); *B29K 2105/103* (2013.01); *B29L 2031/7156* (2013.01); *F17C 2201/0109* (2013.01); *F17C 2203/012* (2013.01); *F17C 2203/0604* (2013.01); *F17C 2203/0619* (2013.01);
(Continued)

(58) Field of Classification Search
CPC ....... B29C 53/602; B29C 53/66; B29C 70/32; B29C 70/54; B29K 2105/103; B29L 2031/7156; F17C 1/06; F17C 2201/0109; F17C 2203/012; F17C 2203/0604; F17C 2203/0619; F17C 2203/0673; F17C 2209/2154; F17C 2209/232; Y02E 60/32
See application file for complete search history.

(56) References Cited

U.S. PATENT DOCUMENTS

2006/0065664 A1 3/2006 Ohta et al.

FOREIGN PATENT DOCUMENTS

JP 2008-304038 A 12/2008
JP 2010-223243 A 10/2010
(Continued)

OTHER PUBLICATIONS

Translation of JP 2022030873, Miyoshi. (Year: 2022).*
(Continued)

*Primary Examiner* — Philip C Tucker
*Assistant Examiner* — Jimmy R Smith, Jr.
(74) *Attorney, Agent, or Firm* — Rankin, Hill & Clark LLP

(57) ABSTRACT

The present invention provides a method for manufacturing a high pressure tank having a reinforcing layer on an outer surface of a hollow liner, the method including: a winding process of winding a fiber bundle containing a curable resin and having a predetermined tension on the outer surface of the liner; and a reinforcing layer forming process of forming the reinforcing layer by curing the curable resin contained in the fiber bundle wound around the outer surface, in which the winding process is performed so that the tension of the fiber bundle is reduced toward an outer circumferential side of the reinforcing layer.

5 Claims, 8 Drawing Sheets

(51) Int. Cl.
*B29K 105/10* (2006.01)
*B29L 31/00* (2006.01)
*F17C 1/06* (2006.01)

(52) U.S. Cl.
CPC ................. *F17C 2203/0673* (2013.01); *F17C 2209/2154* (2013.01); *F17C 2209/232* (2013.01)

(56) References Cited

FOREIGN PATENT DOCUMENTS

| | | | |
|---|---|---|---|
| JP | 2019-127968 | A | 8/2019 |
| JP | 2020-85095 | A | 6/2020 |
| JP | 2022-030873 | A | 2/2022 |
| WO | 2004/070258 | A1 | 8/2004 |

OTHER PUBLICATIONS

Japanese Office Action received in corresponding Japanese application No. 2023-143334 dated Oct. 8, 2024 with English Translation (10 pages).

* cited by examiner

METHOD FOR MANUFACTURING HIGH PRESSURE TANK

BACKGROUND OF THE INVENTION

Field of the Invention

The present invention relates to a method for manufacturing a high pressure tank.

Description of the Related Art

In the related art, a high pressure tank having a reinforcing layer formed by winding a fiber containing a curable resin around the outside of a substantially round tubular shaped liner having dome portions at both ends is known (for example, see Patent Literature 1). The reinforcing layer of the high pressure tank includes a helical layer in which the fiber is helically wound, and a hoop layer in which the fiber is wound in a hoop shape outside the helical layer. In this method for manufacturing a high pressure tank, the tension of the fiber when forming the hoop layer that is the outer layer is set to be greater than the tension of the fiber when forming the helical layer that is the inner layer. According to the high-pressure tank manufactured by this method, delamination at the interface between the helical layer (inner layer) and the hoop layer (outer layer) can be suppressed even if gas is filled and released repeatedly in a hot and humid environment.

PRIOR ART DOCUMENT(S)

Patent Literature(s)

Patent Literature 1: JP2022-030873A

However, in a prior art method for manufacturing a high pressure tank (for example, see Patent Literature 1), it is considered that the tension of the fiber of the outer layer is larger than that of the fiber of the inner layer, and thus the fiber of the inner layer is loosened. When the fibers of the inner layer are loosened, the breaking strength of the reinforcing layer may be reduced.

An object of the present invention is to provide a method for manufacturing a high pressure tank which more reliably increases the breaking strength of a reinforcing layer as compared with the conventional art.

SUMMARY OF THE INVENTION

In order to achieve the object, the present invention provides a method for manufacturing a high pressure tank having a reinforcing layer on an outer surface of a hollow liner, the method including: a winding process of winding a fiber bundle containing a curable resin and having a predetermined tension on the outer surface of the liner; and a reinforcing layer forming process of forming the reinforcing layer by curing the curable resin contained in the fiber bundle wound around the outer surface, in which the winding process is performed so that the tension of the fiber bundle is reduced toward an outer circumferential side of the reinforcing layer.

According to the method for manufacturing a high pressure tank of the present invention, the breaking strength of the reinforcing layer can be more reliably increased than in the related art.

DESCRIPTION OF THE INVENTION

Next, an embodiment for carrying out the present invention will be described in detail with reference to the drawings as appropriate. First, a structure of the high pressure tank obtained by the method according to this embodiment will be described.

Figure 1:
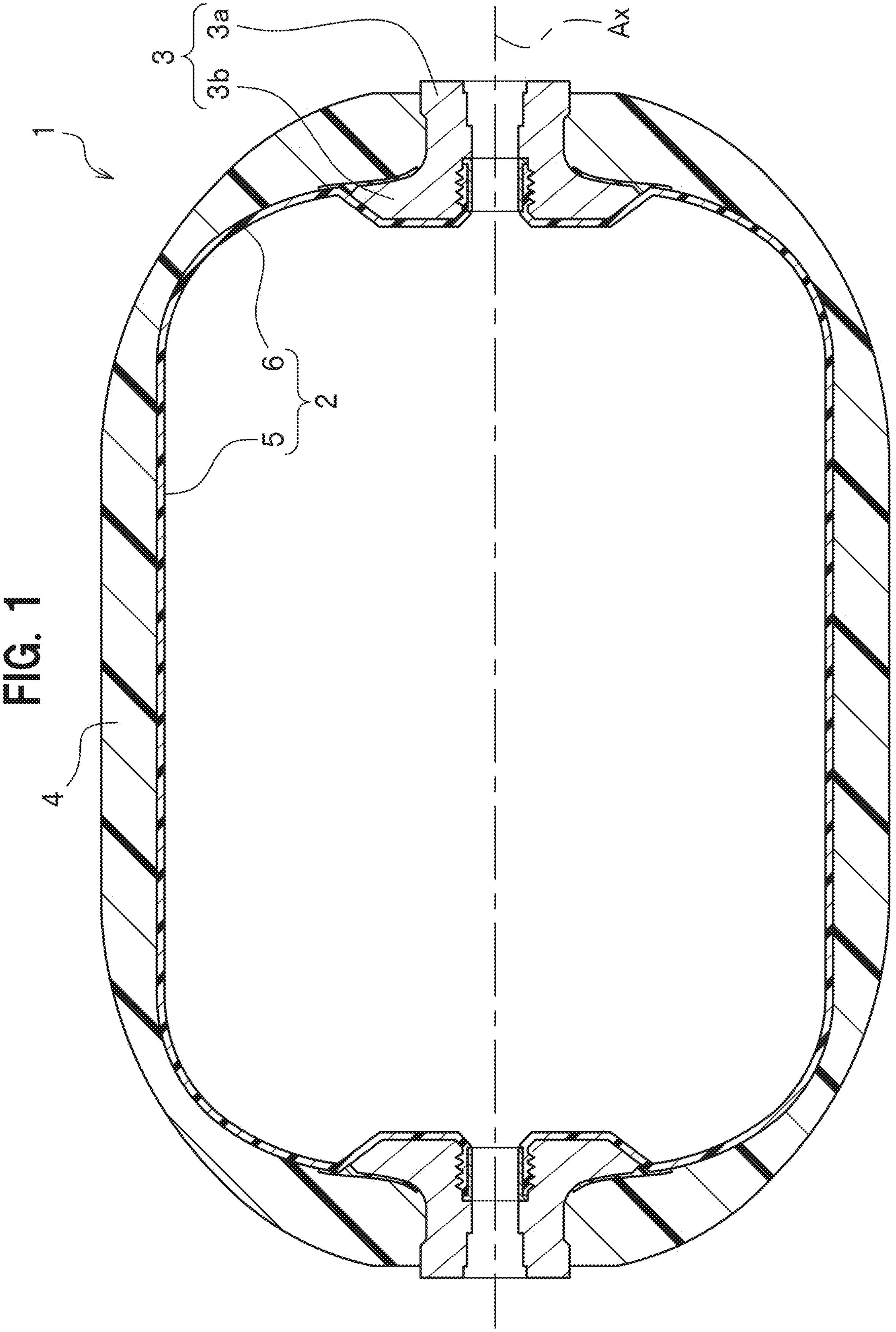
FIG. 1 is a longitudinal section view of a high pressure tank obtained by a method according to an embodiment of the present invention.
Figure 2:
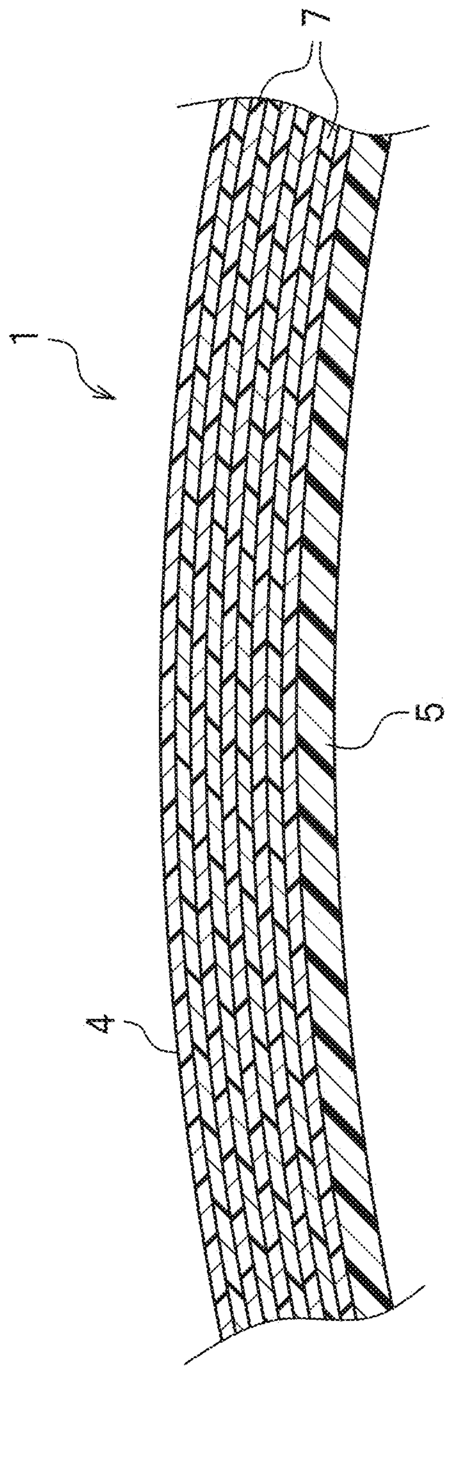
FIG. 2 is a partial enlarged side view of the high pressure tank obtained by the method according to the embodiment of the present invention.

FIG. 1 is the longitudinal section view of the high pressure tank 1. FIG. 2 is the partial enlarged side view of the high pressure tank 1.

For example, the high pressure tank 1 of this embodiment is a high pressure tank that is mounted on a fuel cell vehicle and stores hydrogen gas to be supplied to a fuel cell system. However, the high pressure tank 1 is not limited to this. The high pressure tank 1 may be a high pressure tank used for another high pressure gas.

As shown in FIG. 1, a high pressure tank 1 includes a liner 2, a mouthpiece 3 connected to the liner 2, and a reinforcing layer 4 covering the outside of the mouthpiece 3 from the liner 2.

For example, the mouthpiece 3 is formed of a metal material such as aluminum alloy. The mouthpiece 3 includes a cylindrical mouthpiece body 3*a* having a feed/discharge hole therein and a flange portion 3*a* formed at one end of the mouthpiece body 3*b* in the axial direction.

The liner 2 is a hollow body made of thermoplastic resin. For example, the thermoplastic resin may be a polyamide resin, a polyethylene resin, or the like, but is not limited thereto.

The liner 2 of this embodiment includes a round tubular shaped body portion 5 and dome portions 6 integrally formed at both ends of the body portion 5.

As shown in FIG. 1, the dome portion 6 is a flat bowl-shaped body which is gradually reduced in diameter as it goes away from the body portion 5 side to the outside in the Ax-axis direction.

The radial central portion of the dome portion 6 is recessed to correspond to the shape of the flange portion 3*b* of the mouthpiece 3.

As shown in FIG. 1, the reinforcing layer 4 is formed from the outer surface of the liner 2 to the outer surface of the mouthpiece 3.

As will be explained in detail later, the reinforcing layer 4 is formed by curing a curable resin contained in a tow prepreg wound around the mouthpiece 3 from the liner 2.

The tow prepreg of this embodiment is formed of a fiber bundle (tow) of a reinforcing fiber containing the curable resin, and has adhesiveness.

For example, the curable resin of the tow prepreg may be a thermosetting resin such as an epoxy resin, a phenol resin, an unsaturated polyester resin, a polyimide resin, or the like, but is not limited thereto.

In addition, for example, the reinforcing fiber may be a carbon fiber, a glass fiber, an aramid fiber, boron fiber, an alumina fiber, a silicon carbide fiber, or the like, but is not limited thereto.

As shown in FIG. 2, the reinforcing layer 4 is composed of a plurality of unit layers 7 laminated on the outer surface of the liner 2. The reinforcing layer 4 of this embodiment is composed of nine unit layers 7 in the body portion 5 of the liner 2, but the number of the unit layers 7 is not limited to this.

The unit layer 7 is formed by arranging bands B (see FIG. 3), which are band-shaped fiber bundles fed from a band feeding head 13*b* in a manufacturing equipment 10 (see FIG. 3) described later, in parallel in the axial direction of the liner 2 (the direction perpendicular to the paper surface of FIG. 2).

These unit layers 7 are integrated in a reinforcing layer forming process in which the curable resin of the tow prepreg is cured. The reinforcing layer forming process will be described later.

Next, the manufacturing equipment 10 of the high pressure tank 1 will be described.

Figure 3:
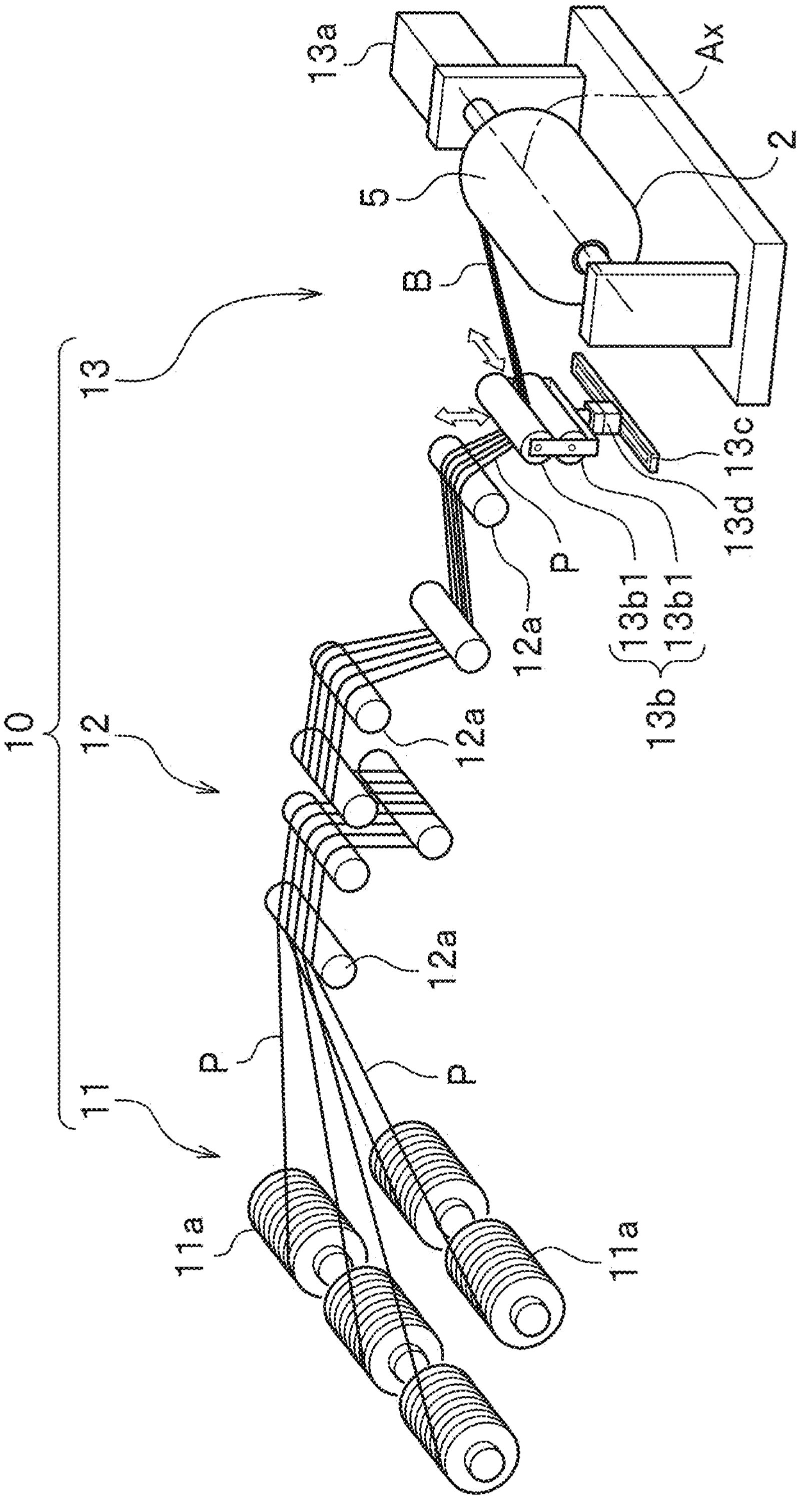
FIG. 3 is a configuration diagram of the high pressure tank manufacturing equipment used in the method according to the embodiment of the present invention.

FIG. 3 is a configuration diagram of the manufacturing equipment 10.

As shown in FIG. 3, the manufacturing equipment 10 includes a feeding mechanism 11 for feeding the tow prepreg P, a guiding mechanism 12 for guiding the tow prepreg P fed from the feeding mechanism 11 to a winding mechanism 13, and the winding mechanism 13 for winding the tow prepreg P guided by the guiding mechanism 12 around the liner 2.

The feeding mechanism 11 includes a plurality of bobbin shafts 11*a* around which the tow prepreg P is traverse wound, and a bobbin shaft motor (not shown) that assists rotation of the bobbin shafts 11*a* so that the tow prepreg P is pulled out from each bobbin shaft 11*a* at a predetermined tension. In the feeding mechanism 11 of this embodiment, the number of bobbin 11*a* is five. However, the number of the bobbin 11*a* is not limited to this. The number of bobbin 11*a* can be changed as required.

The guiding mechanism 12 includes a plurality of guiding rollers 12*a* over which the tow prepreg P is stretched. The guiding roller 12*a* has a plurality of guiding circumferential grooves (not shown) to individually guide the plurality of tow prepreg P fed from the feeding mechanism 11. These guiding circumferential grooves have a flat bottom face with a predetermined width. The tow prepreg P travels from the feeding mechanism 11 on the upstream side to the winding mechanism 13 on the downstream side while abutting against the bottom faces of the guiding circumferential grooves. As a result, the cross-sectional shape of the tow prepreg P is gradually flattened.

Each guiding roller 12*a* of this embodiment guides a plurality of (five) tow prepreg P fed from the feeding mechanism 11 in a lump. However, the guiding roller 12*a* may be configured by a divided roller that individually guides the plurality of tow prepregs P. In addition, the guiding mechanism 12 of this embodiment has seven guiding rollers 12*a*, but the number of guiding rollers 12*a* is not limited thereto.

The winding mechanism 13 includes a driving portion 13*a* (rotating motor) that rotates the liner 2 around the Ax-axis and a band feeding head 13*b* that feeds the band B to the rotating liner 2.

The band feeding head 13*b* arranges a plurality of (five) tow prepregs P flattened by the guiding mechanism 12 in the widthwise direction and integrates them. As a result, the band feeding head 13*b* forms a band B which is a band-shaped tow prepreg P.

The band feeding head 13*b* is composed of a pair of compressing rollers 13*b*1 and 13*b*1 arranged in parallel with a predetermined clearance therebetween. The plurality of (five) tow prepregs P arranged side by side on the upstream side of the band feeding head 13*b* are press-formed into the widened band B when passing between the pair of compressing rollers 13*b*1 and 13*b*1.

The band feeding head 13*b* can move in the Ax-axis direction of the liner 2 while feeding the band B to the rotating liner 2. Specifically, the band feeding head 13*b* moves in the Ax-axis direction in accordance with the rotation of the liner 2 so that the unit layer 7 (see FIG. 2) is formed on the outer circumferential side of the liner 2. The moving means of the band feeding head 13*b* of this embodiment is a linear actuator 13*c* such as a pneumatic cylinder or a linear motor, but is not limited thereto.

The band feeding head 13*b* is configured to adjust the tension of the band B to be fed to the liner 2. Specifically, the band feeding head 13*b* adjusts a load applied to the tow prepreg P in a direction intersecting the travel direction of the tow prepreg P. The tension adjustment means of the band B of this embodiment is a spacing adjustment actuator 13*c* provided between the linear actuator 13*b* and the band feeding head 13*d*. The spacing adjustment actuator 13*d* may be a rack-and-pinion mechanism or a pneumatic cylinder driven by a rotating motor, but is not limited thereto.

Further, the spacing adjustment actuator 13*d* of this embodiment displaces the band feeding head 13*b* based on the detected tension of the tow prepreg P or the band B so that the detected tension becomes a preset target tension. The means for detecting the tension of the tow prepreg P or the band B is a sensor for detecting the reaction force that the band feeding head 13*b* receives from the tow prepreg P or the band B, but is not limited thereto.

The displacement control means of the band feeding head 13*b* includes a program for instructing the spacing adjustment actuator 13*d* to set the detected tension of the tow prepreg P or the band B to the target tension, a read only memory (ROM) for storing the program, a random access memory (RAM) for reading and developing the program stored in the ROM, and a central processing unit (CPU) for executing the developed program and outputting an instruction to the spacing adjustment actuator 13*d*.

Next, a method for manufacturing the high pressure tank 1 of this embodiment will be described.

The method according to this embodiment includes a winding process of winding the band B (see FIG. 3) in which the tow prepreg P (see FIG. 3) is formed in a band shape on the outer surface of the liner 2 (see FIG. 3), and a reinforcing layer forming process of forming the reinforcing layer 4 (see FIG. 2) by curing the curable resin included in the tow prepreg P wound around the outer surface of the liner 2.

Here, the method according to this embodiment will be described in detail by taking as an example a method of winding the band B (see FIG. 3) around the body portion 5 (see FIG. 3) of the liner 2 (see FIG. 3) by a hoop winding.

Figure 4:
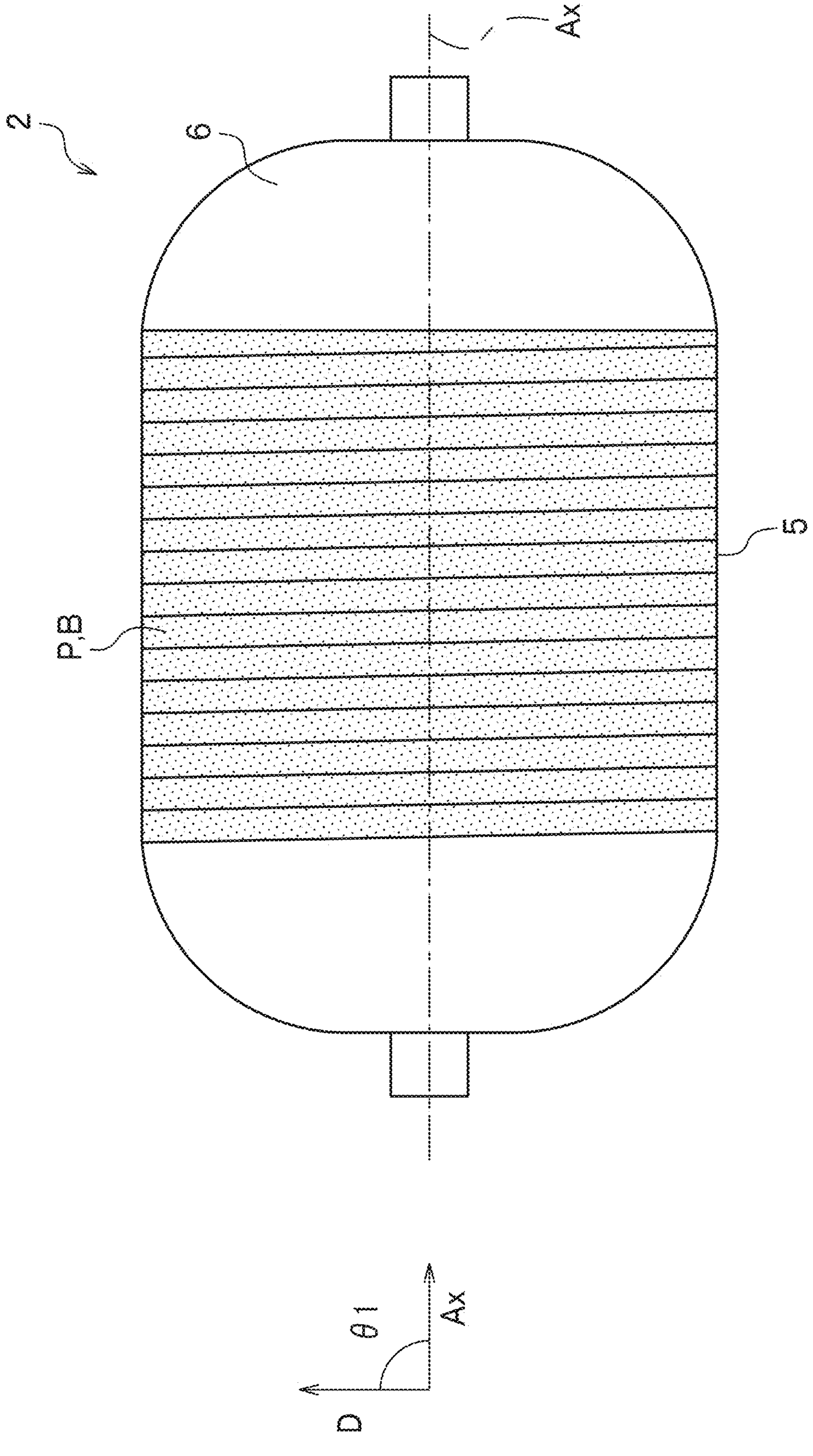
FIG. 4 is an explanatory diagram of a hoop winding of the fiber bundle performed in the method according to the embodiment of the present invention.

FIG. 4 is an explanatory diagram of the hoop winding of band B around the liner 2.

As shown in FIG. 4, the hoop winding is a method in which the band B is wound in a hoop shape (in a ring shape) around the body portion 5 of the liner 2. That is, the hoop winding is set so that an angle θ1 formed by the extended direction D of the band B with respect to the Ax-axis direction is close to 90 degrees so that the band B is parallel to the Ax-axis direction. As a result, the band B forms a unit layer 7 (see FIG. 2) having a thickness substantially equal to the thickness of the band B on the outer circumference of the body portion 5 of the liner 2.

Figure 5:
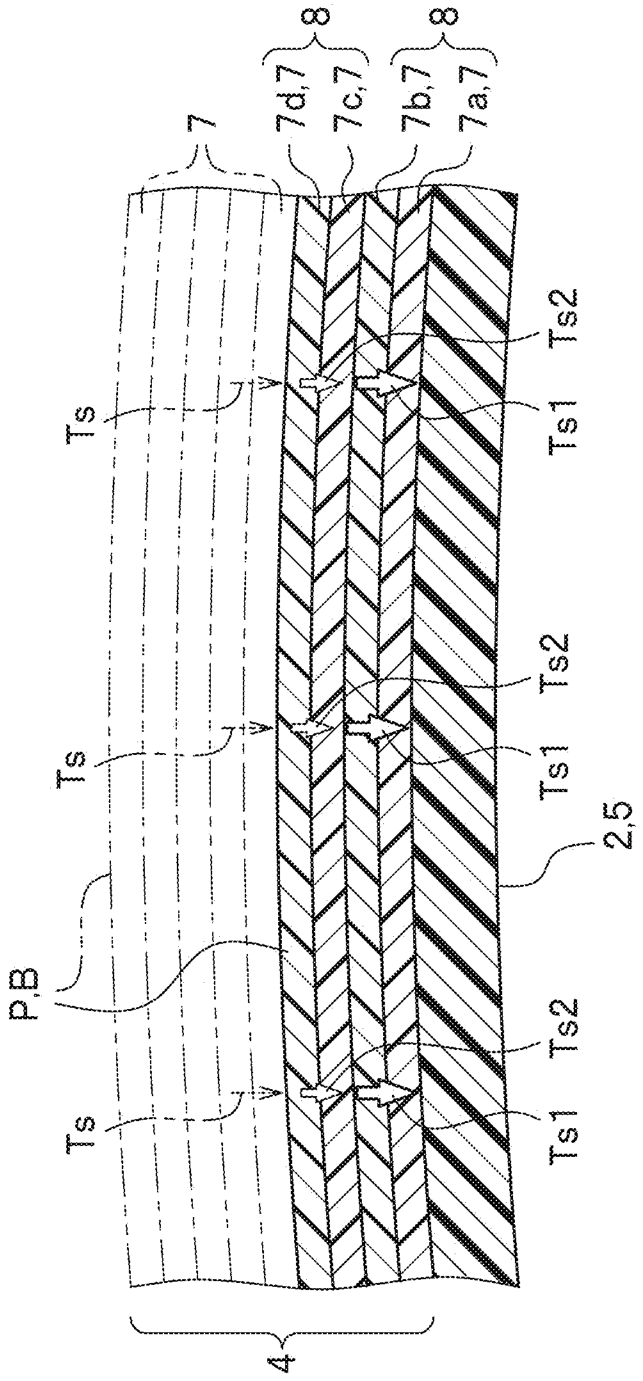
FIG. 5 is an explanatory diagram of a fiber bundle winding process performed in the method according to the embodiment of the present invention.

FIG. 5 is an explanatory diagram of the winding process of band B by the hoop winding.

As shown in FIG. 5, in this winding process, a plurality of unit layers 7 are formed on the outer circumference of the body portion 5 of the liner 2. As shown in FIG. 3, in the hoop winding, the band feeding head **13*b* is reciprocated with respect to the rotating liner 2 by a distance corresponding to the body portion 5 of the liner 2, thereby forming the unit layer 7. Specifically, the odd-numbered unit layer 7 (see FIG. 5) is formed in the forward path of the band feeding head 13*b* (see FIG. 3), and the even-numbered unit layer 7 (see FIG. 5**) is formed in the backward path.

The winding process is performed so that the tension of the fiber bundle in the band B is reduced as the fiber bundle goes toward the outer circumference of the reinforcing layer 4 (see FIG. 2). Specifically, the winding process is performed to reduce the tension of the band B in a stepwise manner by a predetermined tension reduction width in the layer thickness direction of the reinforcing layer 4 (see FIG. 2).

In FIG. 5, tensions Ts, Ts1, and Ts2 of the band B (see FIG. 3) are indicated by white arrows pointing downward on the paper for convenience of drawing.

Further, as shown in FIG. 5, the winding process is preferably performed to reduce the tension of the band B for each multi-layer 8 formed by overlapping at least two unit layers 7 in the layer thickness direction of the reinforcing layer 4. The multi-layer 8 of this embodiment is composed of two unit layers 7, but may be composed of three or more unit layers 7.

As shown in FIG. 5, in the winding process of this embodiment, the tension of the band B (see FIG. 3) of the multi-layer 8 including the unit layer **7*a* of the first layer and the unit layer 7*b* of the second layer is set to the first tension Ts1. The tension of the band B (see FIG. 3) of the multi-layer 8 including the unit layer 7*c* of the third layer and the unit layer 7*d* of the fourth layer is set to the second tension Ts2. Further, a plurality of unit layers 7 (indicated by a virtual line (two dot chain line) in FIG. 5) sequentially stacked on the unit layer 7*d* are also formed of two unit layers 7 (not shown). The tension of the band B (see FIG. 3) is set to a different tension Ts for each multi-layer 8**.

Figure 6:
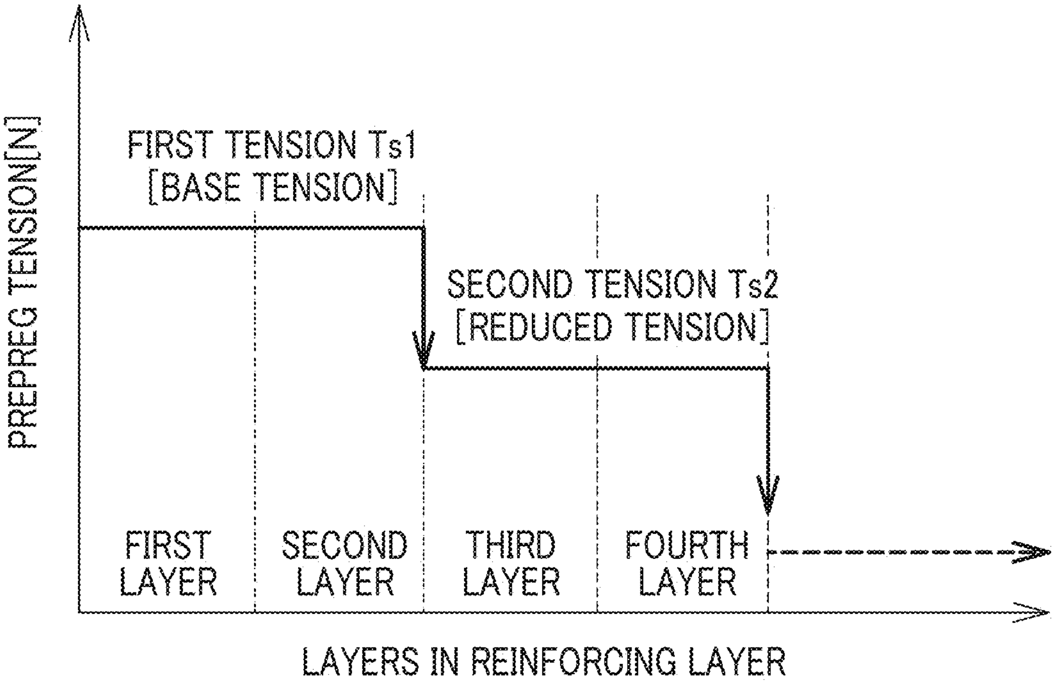
FIG. 6 is a graph showing a procedure for reducing the tension of a fiber bundle (prepreg) in the winding process.

FIG. 6 is a graph showing a procedure for reducing the tension of the band B in the winding process.

The tension of the band B (a prepreg tension in FIG. 6) is reduced stepwise from the first tension Ts1 to the second tension Ts2.

The winding process of this embodiment includes a base tension winding process of winding the band B (the first layer and the second layer) around the liner 2 (see FIG. 3) at a first tension Ts1 (the base tension) at which the winding of the band B (see FIG. 3) is started, and a reduced tension winding process of winding the band B (the third layer and the fourth layer) at a second tension Ts2 lower than the first tension Ts1 (the base tension) around the band B (the first layer and the second layer) wound at the first tension Ts1 (the base tension).

In addition, the unit layer 7 (see FIG. 5) of the fifth layer or higher can also reduce the tension (the prepreg tension in FIG. 6) of the band B in a stepwise manner for each multi-layer (not shown).

As will be explained in detail later, the tension reduction width of the second tension Ts2 with respect to the first tension Ts1 (the base tension) is preferably set in a range of 1.00N or more, 4.50N or less.

In addition, as will be explained in detail later, the first tension Ts1 (the base tension) is preferably set so that the breaking strength of the reinforcing layer 4 (see FIG. 1) becomes a peek value when the tension reduction width is in the range of 1.00N or more, 4.50N or less.

As shown in FIG. 4, in the method according to this embodiment, after the base tension winding process and the reduced tension winding process are performed only around the body portion 5 of the liner 2, the band B (see FIG. 3) is further wound around the liner 2 (see FIG. 3) by the helical winding. Specifically, in this method, the band B is wound by a high helical winding around the band B (see FIG. 4) wound around the body portion 5 by the hoop winding, and the band B is further wound by a low helical winding around the band B wound by the high helical winding.

Figure 7:
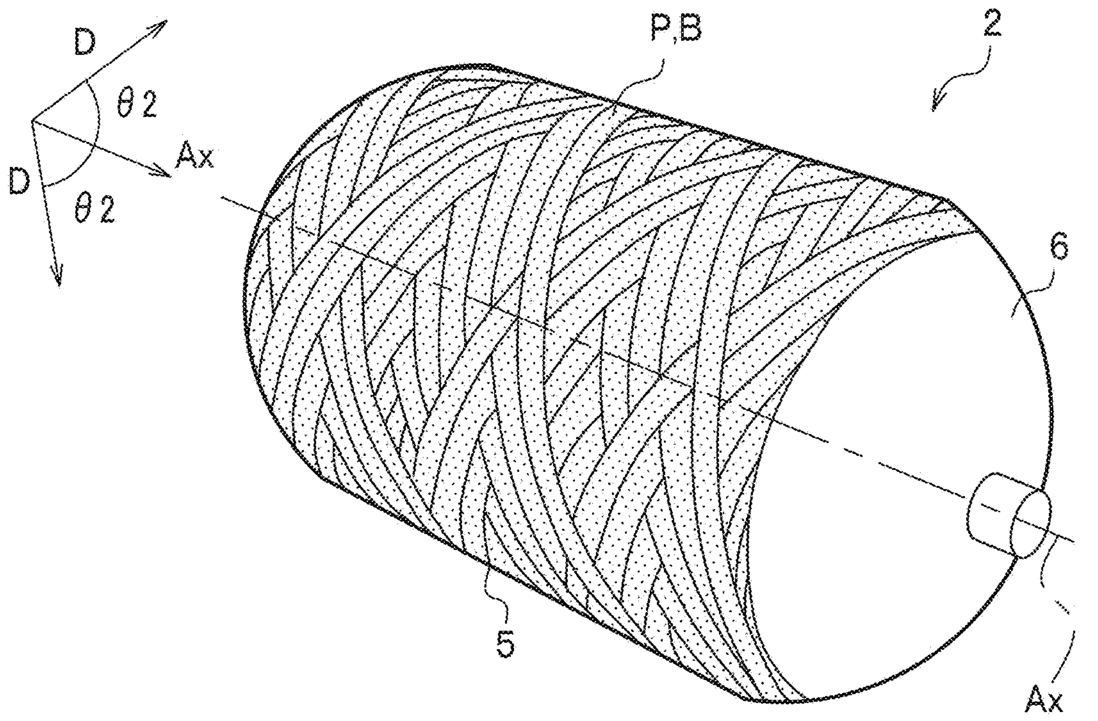
FIG. 7 is an explanatory diagram of a high helical winding of the fiber bundle performed in the method according to the embodiment of the present invention.
Figure 8:
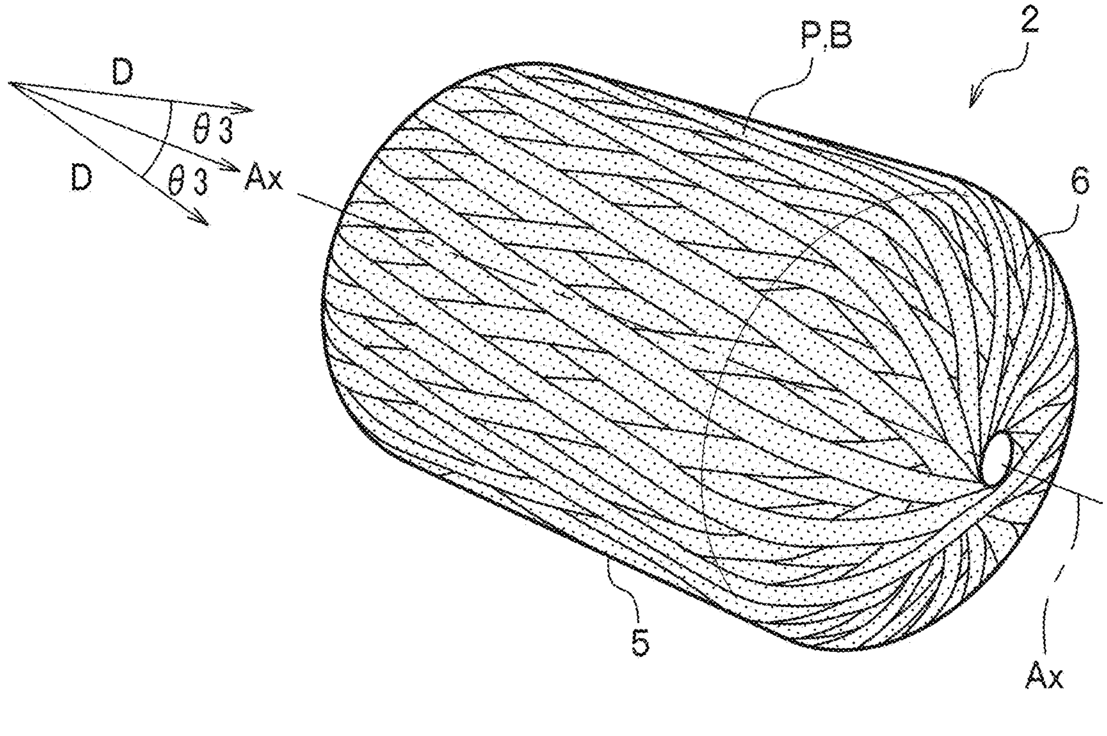
FIG. 8 is an explanatory diagram of a low helical winding of the fiber bundle performed in the method according to the embodiment of the present invention.

FIG. 7 is an explanatory diagram of the high helical winding of the band B (see FIG. 3). FIG. 8 is an explanatory diagram of the low helical winding of the band B (see FIG. 3).

As shown in FIG. 7, the high helical winding is set so that an angle θ2 formed by the extended direction D of the band B (see FIG. 3) with respect to the Ax-axis direction is approximately 75 degrees. As a result, the band B is wound around the body portion 5 of the liner 2 on which the hoop winding is performed and the peripheral portion of the dome portion 6 adjacent to the body portion 5.

As shown in FIG. 8, the low helical winding is set so that an angle θ3 formed by the extended direction D of the band B (see FIG. 3) with respect to the Ax-axis direction is approximately 10 degrees. As a result, the band B is wound around the entire region from the body portion 5 to the dome portion 6 of the liner 2 around which the hoop winding and the high helical winding have been performed.

In the method according to this embodiment, the tension of the band B (see FIG. 3) of the high helical winding and the tension of the band B (see FIG. 3) of the low helical winding are set to be substantially the same as the tension of the band B (see FIG. 3) of the final hoop winding in the reduced tension winding process. However, the tension of the band B (see FIG. 3) of the high helical winding and the tension of the band B (see FIG. 3) of the low helical winding can be set to be reduced toward the outer peripheral side of the reinforcing layer 4 (see FIG. 1).

In the reinforcing layer forming process, the liner 2 (see FIG. 3) which has completed the winding process is removed from the winding mechanism 13 (see FIG. 3) and is heated at a predetermined temperature in a heating furnace (not shown).

As a result, the curable resin contained in the band B (see FIG. 3) wound around the liner 2 is cured. In the process of curing the curable resin, the plurality of unit layers 7 (see FIG. 5) stacked on each other are integrated and are in close contact with the outer surface of the liner 2. Thus, the reinforcing layer 4 (see FIG. 1) is formed, and a series of manufacturing processes of the high pressure tank 1 is completed.

Effects

Next, the operation and effect of the method for manufacturing the high pressure tank 1 of this embodiment will be described.

In the method according to this embodiment, a winding process of the band B (fiber bundle) around the outer surface of the liner 2 is performed so that the tension of the band B (fiber bundle) is reduced toward the outer circumferential side of the reinforcing layer 4.

According to this method, the tension of the band B (fiber bundle) of the outer layer side wound around the liner 2 prevents the band B (fiber bundle) of the inner layer side from being loosened. According to this method, the breaking strength of the reinforcing layer 4 can be more reliably increased as compared with the prior art method (for example, see Patent Literature 1).

Further, as verified in a working example described later, according to this method, a variation in the breaking strength of the reinforcing layer 4 can be reduced while increasing the breaking strength of the reinforcing layer 4.

In this method, the winding process for adjusting the tension of the band B (fiber bundle) is preferably performed only on the body portion 5 of the liner 2.

According to this method, the band B (fiber bundle) is wound more intensively around the body portion 5 than around the dome portion 6 having a relatively high strength against the inner pressure of the high pressure tank 1. Thus, the reinforcing layer 4 can be efficiently reinforced as the whole of the high pressure tank 1.

In addition, the winding process of this method is preferably performed by the hoop winding of the band B (the fiber bundle) on the body portion 5 of the liner 2.

According to this method, the fiber bundle (the band B) is wound around the body portion 5 of the liner 2 so as to form an approximately right angle with respect to the Ax-axis of the liner 2. Thus, the tension of the band B (the fiber bundle) can more effectively contribute to the improvement of the breaking strength of the reinforcing layer 4.

In this method, the winding process is preferably performed to reduce the tension of the band B (the fiber bundle) for each multi-layer 8 formed by overlapping the unit layers 7 in the layer thickness direction of the reinforcing layer 4.

According to this method, the tension reduction width of the band B (the fiber bundle), which is changed toward the outer circumference in a stepwise manner, can be adjusted more accurately, compared to the method of reducing the tension of the band B (the fiber bundle) for each unit layer 7. According to this method, the variation in breaking strength of the reinforcing layer 4 can be further reduced.

Further, in this method, the tension reduction width of the band B (the fiber bundle) is preferably set in the range of 1.00N or more, 4.50N or less with respect to the tension (the base tension) at the winding start of the band B (the fiber bundle) around the liner 2.

As verified in the working example described later, according to this method, the breaking strength of the reinforcing layer 4 can be effectively improved.

Further, in this method, the tension (the base tension) at the start of winding of the band B (the fiber bundle) is preferably set so that the breaking strength of the reinforcing layer 4 becomes the peek value in the range where the tension reduction width is 1.00N or more, 4.50N or less.

As verified in the working example described later, according to this method, the breaking strength of the reinforcing layer 4 can be more effectively improved.

Also, in the winding process of this method, a combination of the hoop winding and the helical winding can be performed in the layer thickness direction of the reinforcing layer 4.

According to this method, the orientation directions of the fiber bundles in the reinforcing layer 4 of the liner 2 can be crossed by the hoop winding and the helical winding. This makes it possible to further improve the breaking strength of the reinforcing layer 4.

Although the embodiments of the present invention have been described above, the present invention is not limited to the embodiments and can be implemented in various forms.

WORKING EXAMPLE

The effect of the method for manufacturing the high pressure tank 1 according to the present invention was verified.

Figure 9:
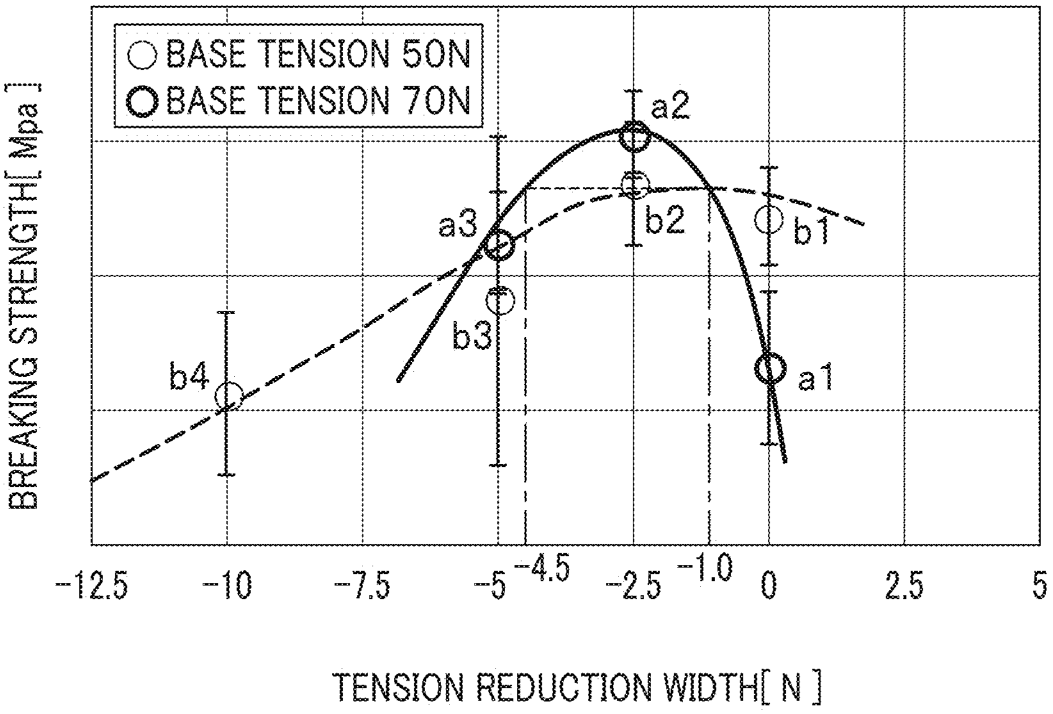
FIG. 9 is a graph showing the relationship between a tension reduction width of a fiber bundle (prepreg) and a breaking strength of a reinforcing layer.

FIG. 9 is a graph showing the relationship between the breaking strength [MPa] of the reinforcing layer 4 (see FIG. 1) and the tension reduction width [N] of the band B (see FIG. 3). As shown in FIG. 6, the tension reduction width [N] is a tension difference obtained by subtracting the second tension Ts2 (reduced tension) from the first tension Ts1 (base tension) at the start of winding of the band B (see FIG. 3) around the body portion 5 (see FIG. 5) of the liner 2.

As shown in FIG. 9, three samples a1 to a3 of high pressure tanks whose base tensions are 70N, and four samples b1 to b4 of high pressure tanks whose base tensions are 50N were prepared.

Specifically, the sample a1 of the high pressure tank had a tension reduction width of 0N. While the base tension was maintained at 70N, the loop winding was performed around the body portion 5 (see FIG. 5) of the liner 2, thereby forming the reinforcing layer which was composed of four layers from the first layer to the fourth layer before curing.

Further, in the sample a2 and the sample a3 of the high pressure tanks, the first layer and the second layer were formed by the loop winding at the base tension 70N, and the third layer and the fourth layer were formed by the loop winding at the second tensions Ts2 (67.5N and 65N) respectively; so as to have the corresponding tension reduction widths (−2.5N and −5.0N shown in FIG. 9), thereby forming the reinforcing layer before curing.

In addition, the sample b1 of the high pressure tank had a tension reduction width of 0N. While the base tension was maintained at 50N, the loop winding was performed around the body portion 5 (see FIG. 5) of the liner 2, thereby forming the reinforcing layer which was composed of four layers from the first layer to the fourth layer before curing.

Further, in the sample b2 to sample b4 of the high pressure tanks, the first layer and the second layer were formed by the loop winding at the base tension 50N, and the third layer and the fourth layer were formed by the loop winding at the second tensions Ts2 (47.5N 45.0N, and 40N) respectively, so as to have the corresponding tension reduction widths (−2.5N, −5.0N, and −10N shown in FIG. 9), thereby forming the reinforcing layer before curing.

After the winding process, the liner 2 was heated in a heating furnace to cure the curable resin contained in the wound band B (see FIG. 3), thereby obtaining the high pressure tanks a1 to a3 and the high pressure tanks b1 to b4 shown in FIG. 9. The breaking strength [MPa] of the reinforcing layer was measured for these high pressure tanks a1 to a3, and the high pressure tanks b1 to b4. The results are shown in FIG. 9. The breaking strength [MPa] in FIG. 9 is in the range of ±2σ (95.5%).

As shown in FIG. 9, in the high pressure tanks a1 to a3, and the high pressure tanks b1 to b4, the high pressure tanks a2 and b2 obtained the peek values of the breaking strengths [MPa] of the reinforcing layers.

Specifically; the high pressure tanks a2 and b2 verified that the breaking strengths [MPa] of the reinforcing layers were further improved by reducing the tensions of the outer band B to be lower than the tension of the inner band B, as compared with the high pressure tanks a1 and b1 obtained by the hoop winding with the prior art constant tensions.

Further, as shown in FIG. 9, it was verified that the breaking strength [MPa] of the reinforcing layer was further improved by setting the tension reduction width [N] of the band B in a range of −1.0N to −4.5N.

Further, as shown in FIG. 9, when the base tension is set to 50N or more and the breaking strength [MPa] of the reinforcing layer becomes the peek value where the tension reduction width [N] is in the range of 1.00N or more, 4.50N or less, a steeper peak of the breaking strength [MPa] is obtained. That is, it was verified that a larger breaking strength [MPa] was obtained.

Next, the breaking strength [MPa] of the reinforcing layer was measured and the variation in the breaking strength was determined for a high pressure tank (the comparative example) in which the first layer to the fourth layer were formed by the loop winding of the band B at a constant tension and a high pressure tank (the working example) in which the third layer and the fourth layer were formed by the loop winding at a lower tension of the band B than that of the first layer and the second layer.

The base tension of the band B in the high pressure tank of the comparative example was set in the range from 10N to 70N. The base tension of the band B in the high pressure tank of the working example was set in the range from 50N to 70N, and the tension reduction width [N] from the first layer and the second layer to the third layer and the fourth layer was set to 2.5N.

Figure 10:
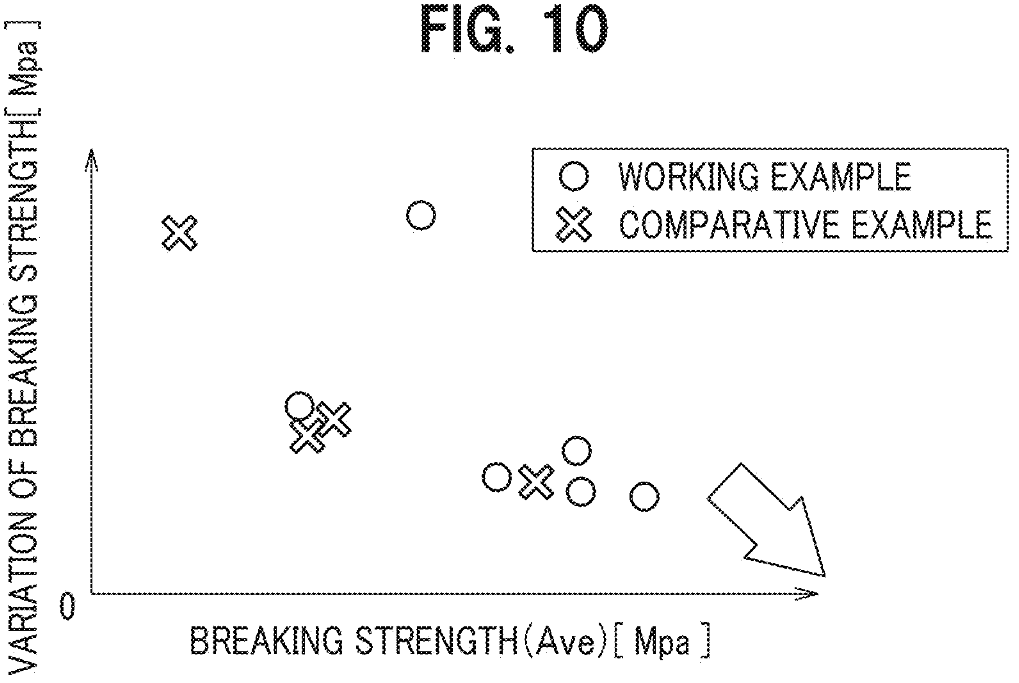
FIG. 10 is a graph showing the relationship between the breaking strength of the reinforcing layer and a variation in the breaking strength.

FIG. 10 is a graph showing the relationship between the breaking strengths of the reinforcing layers of the high pressure tank produced in the working example and the high pressure tank produced in the comparative example, and the variation in the breaking strengths.

As shown in FIG. 10, the data group represented by the circle mark relating to the high pressure tank of this working example is shifted toward the preferred corner coordinate position represented by the white arrow, which has a higher breaking strength and a smaller variation in breaking strength than the data group represented by the cross mark relating to the high pressure tank of the comparative example. Specifically, it was verified that the high pressure tank of this working example can increase the breaking strength of the reinforcing layer by 9.5% and reduce the variation in the breaking strength by 9.3% by increasing the base tension and reducing the tension of the band B toward the outer circumferential side as compared with the high pressure tank of the comparative example.

What is claimed is:

1. A method for manufacturing a high pressure tank having a reinforcing layer on an outer surface of a hollow liner, the method comprising:

a winding process of winding a fiber bundle containing a curable resin and having a predetermined tension on the outer surface of the liner; and a reinforcing layer forming process of forming the reinforcing layer by curing the curable resin contained in the fiber bundle wound around the outer surface, wherein the winding process is performed so that the tension of the fiber bundle is reduced toward an outer circumferential side of the reinforcing layer, the winding process comprises:

a base tension winding process of winding the fiber bundle around the liner at a base tension at which winding of the fiber bundle is started; and a reduced tension winding process of winding the fiber bundle at a tension lower than the base tension around the fiber bundle wound at the base tension, the lower winding tension is set in a range of 1.00N to 4.50N, and the base tension is set so that a breaking strength of the reinforcing layer becomes a maximum value when the lower winding tension is set in a range of 1.00N to 4.50N.

2. The method according to claim 1, wherein the liner includes a round tubular shaped body portion and dome portions at both ends of the body portion, and the winding process is performed only around the body portion of the liner.

3. The method according to claim 2, wherein the winding process is performed by a hoop winding of the fiber bundle around the body portion of the liner.

4. The method according to claim 1, wherein the reinforcing layer is composed of a plurality of unit layers laminated on the outer surface of the liner, and each unit layer is formed by arranging band-shaped fiber bundles in parallel in an axial direction of the liner, and the winding process is performed to reduce tension of each fiber bundle for each multi-layer formed by overlapping at least two unit layers in a layer thickness direction of the reinforcing layer.

5. The method according to claim 1, wherein the winding process is performed in a layer thickness direction of the reinforcing layer by a combination of hoop winding and helical winding.

* * * * *